United States Patent

Garrett et al.

[11] Patent Number: 4,898,266
[45] Date of Patent: Feb. 6, 1990

[54] DOUBLE ELEMENT ELECTROVISCOUS FLUID CLUTCH

[75] Inventors: Wayne H. Garrett, Troy; David A. Janson, Plymouth, both of Mich.

[73] Assignee: Eaton Corporation, Cleveland, Ohio

[21] Appl. No.: 343,962

[22] Filed: Apr. 27, 1989

[51] Int. Cl.⁴ .................. F16D 35/00; F16D 43/25
[52] U.S. Cl. ................... 192/21.5; 192/58 B; 192/82 T; 192/84 E
[58] Field of Search ............ 192/58 B, 82 T, 21.5, 192/84 E; 188/267

[56] References Cited

U.S. PATENT DOCUMENTS

| | | | |
|---|---|---|---|
| 2,818,148 | 12/1957 | Winther | 192/21.5 |
| 2,822,070 | 2/1958 | Jaeschke | 192/21.5 |
| 3,150,678 | 9/1964 | Nuber | 192/21.5 X |
| 3,972,399 | 8/1976 | Bopp | 192/58 |
| 4,046,239 | 9/1977 | Tinholt | 192/58 |
| 4,056,178 | 11/1977 | Detty | 192/58 |
| 4,181,205 | 1/1980 | Mennucci et al. | 192/58 |
| 4,190,139 | 2/1980 | Tinholt et al. | 192/58 |
| 4,246,995 | 1/1981 | Gee | 192/58 |
| 4,312,433 | 1/1982 | Bopp | 192/58 |
| 4,346,797 | 8/1982 | Bopp | 192/58 |
| 4,351,425 | 9/1982 | Bopp | 192/82 T X |
| 4,362,226 | 12/1982 | Gee | 192/58 |
| 4,591,037 | 5/1986 | Bopp | 192/58 |
| 4,727,969 | 3/1988 | Hayashi et al. | 192/58 B |
| 4,744,914 | 5/1988 | Filisko et al. | 252/74 |
| 4,782,927 | 11/1988 | Sproston et al. | 192/21.5 |

Primary Examiner—Rodney H. Bonck
Attorney, Agent, or Firm—J. G. Lewis

[57] ABSTRACT

An electroviscous fan clutch (10) is employed as an accessory drive mechanism within a truck or automobile. A shaft (36), either driven by the engine or driving a load (31), carries a clutch member (14) arranged for fluid engagement with a body member (12) for the transmission of torque therebetween when electroviscous fluid is disposed in an operating chamber (45) defined by complimentary shear surfaces (40 and 44) in the clutch and body members. The clutch and body members are electrodes, connected to a source of high voltage potential (86), which establish an electrostatic field within the operating chamber to selectively vary the characteristic viscosity of fluid flowing therethrough.

10 Claims, 2 Drawing Sheets

DOUBLE ELEMENT ELECTROVISCOUS FLUID CLUTCH

INTRODUCTION

The present invention relates to viscous fluid couplings, and more particularly to such couplings which employ electroviscous fluid to effect the transmission of torque between opposed coupling members.

CROSS REFERENCE

The subject matter of this application is related to that of an application filed on even date herewith entitled "Electroviscous Fluid Clutch" naming inventors Wayne H. Garrett and David A. Janson.

BACKGROUND OF THE INVENTION

It will be apparent from a reading of the specification that the present invention may be advantageously utilized with fluid couplings intended many different applications. However, the invention is especially useful when applied to a viscous fluid coupling or clutch which serves as a drive for an accessory of a vehicle engine, and will be described in connection therewith.

Viscous fluid couplings have received wide acceptance in the automobile industry, particularly for controlling the amount of torque transmitted to a vehicle radiator cooling fan. The most common form of such viscous fluid couplings is the air temperature response type such as illustrated in U.S. Pat. Nos. 3,055,473 to Oldberg et al and 3,809,197 to Clancey. In certain applications, however, it has become desirable to directly sense other system parameters, such as water temperature in the radiator, rather than the temperature of air passing through the radiator. To date, many arrangements have been proposed to accomplish this result. These arrangements, however, have made use of wet or dry plate clutches that are electrically actuated. In each of these arrangements, the advantages achieved through the use of viscous fluid have not been applied.

Another disadvantage common to viscous fluid couplings employing centrifugal pumps to circulate the fluid between a storage chamber and an operating chamber lies in the viscosity-temperature characteristic of typical silicon based viscous fluids. The viscosity of the fluid varies with ambient temperature and thus the transmission of torque between the shear surfaces can be controlled only by physical modulation of the circulating fluid flow between the operating and storage chambers. This flow is typically modulated by a valve element which selectively overlies a drain port interconnecting the storage and operating chambers. Although this approach has been acceptable for certain applications such as ON-OFF type fan drives, other applications demand more rapid or a tailored response of the clutch. Furthermore, the characteristically abrupt (dis)engagement of many known couplings renders them unsuitable for larger load applications.

More recently, so called electroviscous fluids have been developed for use in the fluid-actuated devices such as described in U.S. Pat. Nos. 4,782,927 and 4,744,914. Such fluids, when subjected to an electrostatic potential, become increasingly viscous or even solid. This effect, sometimes called the Winslow effect, is broadly described in Winslow's U.S. Pat. No. 2,417,850.

Electroviscous fluids exhibiting this property comprise a suspension of particles generally having a high dielectric constant in a fluid generally having a low dielectric constant. The particles are typically hydrophilic particles to which water is absorbed to impart a high dielectric property. In devices actuated with the use of an electroviscous fluid, the fluid is contained in a small gap between two electrically conductive members which serve as electrodes. When the device is a valve, the fluid can flow freely through this gap. When the device is a mechanical device, such as a clutch or brake, the two members can be moved freely relative to one another while maintaining the gap. When an electric potential is applied to the electrodes the fluid, in effect, solidifies thereby inhibiting fluid flow through a control orifice (in the case of the valve) or preventing relative movement between the electrodes (in the case of a brake or clutch).

The pressure which the device is capable of withstanding in the case of a valve or the force or torque which the device is capable of withstanding in the case of a clutch or brake is dependent upon the electrostatic potential applied between the electrodes. With an increasing electrostatic field, the shear force which the fluid is capable of withstanding is progressively increased until a point is reached when the fluid will no longer flow and effectively becomes solid. In the case of the valve, the reaching of this point means that the valve is fully closed, and in the case of a clutch or brake, the reaching of the solid state results in cessation of slipping.

A disadvantage of known electroviscous fluid-actuated devices employed as clutches or brakes, is that the fluid is permanently resident within the gap between the two torque transmitting members. Even with the fluid in its least viscous state, with no electrostatic field applied there across, the fluid continues to exhibit a finite degree of viscosity and thus continues to transmit a limited amount of torque across the members. In certain applications, it would be desirable to eliminate this efficiency robbing parasitic loss and resulting heat build-up and performance degradation. A further disadvantage of known electroviscous fluid actuated devices is in their relative large size and weight, shortcomings which are particularly disadvantageous for controlling vehicle accessories.

BRIEF DESCRIPTION OF THE INVENTION

The present invention finds particular application in a viscous clutch for driving an accessory such as a engine coolant fan or air conditioning compressor within an automobile or truck, the clutch including first and second members mounted for relative rotation about a common axis and defining cooperating shear surfaces forming an operating chamber therebetween and means for circulating electroviscous fluid between the operating chamber and a storage chamber. A source of high voltage potential is applied across two or more electrodes which are positioned to establish an electrostatic field within a passageway interconnecting the storage chamber and the operating chamber to selectively vary the characteristic viscosity of fluid flowing therethrough and thereby modulate the circulating flow to control the fill or quantity of electroviscous fluid within the operating chamber as a function of a sensed parametric input such as an engine coolant temperature switch or host vehicle logic circuit. This arrangement effectively permits purging of substantially all fluid from the operating chamber in certain clutch operating modes, virtually eliminating parasitic losses and heat related performance degradation.

The preferred embodiment of the invention comprises an electrically conductive clutch member secured for rotation with a shaft, and an electrically conductive cover member rotatably disposed on the shaft relative to the first member and electrically insulated therefrom. Shear surfaces disposed on the clutch and cover members form an operating chamber therebetween. A reservoir cover is affixed to the cover member adjacent the clutch member to define an annular fluid storage chamber in combination with the cover member with the fluid storage chamber disposed coaxially with the shaft. At least one pump is provided defined by adjacent portions of the clutch member and cover member radially opposite the shaft which operates to displace electroviscous fluid from the operating chamber radially inwardly to a point within the fluid storage chamber substantially adjacent the axis of the shaft. Valve means is provided to selectively interconnect the fluid storage chamber and the operating chamber whereby in one condition the valve means prevents electroviscous fluid in the fluid storage chamber from flowing into the operating chamber and in a second condition the valve means establishes fluid communication between the radially outward most portion of the fluid storage chamber and the operating chamber, the electroviscous fluid flowing therebetween under the influence of centrifugal forces acting upon the fluid within the fluid storage chamber during periods of relatively high speed operation of the body member. Finally, a source of variable high voltage potential in circuit with the clutch and cover members is provided whereby the clutch and cover members function as spaced electrodes when a voltage potential is applied there across to establish a variable electrostatic field within the operating chamber to effect a localized change in the characteristic viscosity of fluid within the operating chamber. A third electrode connected to a second source of high voltage is positioned to function as said valve means. This arrangement has the advantage of permitting total disengagement of the clutch wherein all of the electroviscous fluid is pumped out of the operating chamber into the storage chamber whereby static and dynamic bleed back from the storage chamber to the operating chamber is prevented. Furthermore, this arrangement has the advantage of providing rapid responsive electrical flow control of circulating electroviscous fluid within the clutch.

Various other features and advantages of this invention will become apparent upon reading the following specification, which, along with the patent drawings, describes and discloses a preferred illustrative embodiment of the invention as well as two alternative embodiments of the invention in detail.

The invention makes reference to the accompanying drawings.

DETAILED DESCRIPTION OF THE PREFERRED AND ALTERNATIVE EMBODIMENTS

Figure 1:
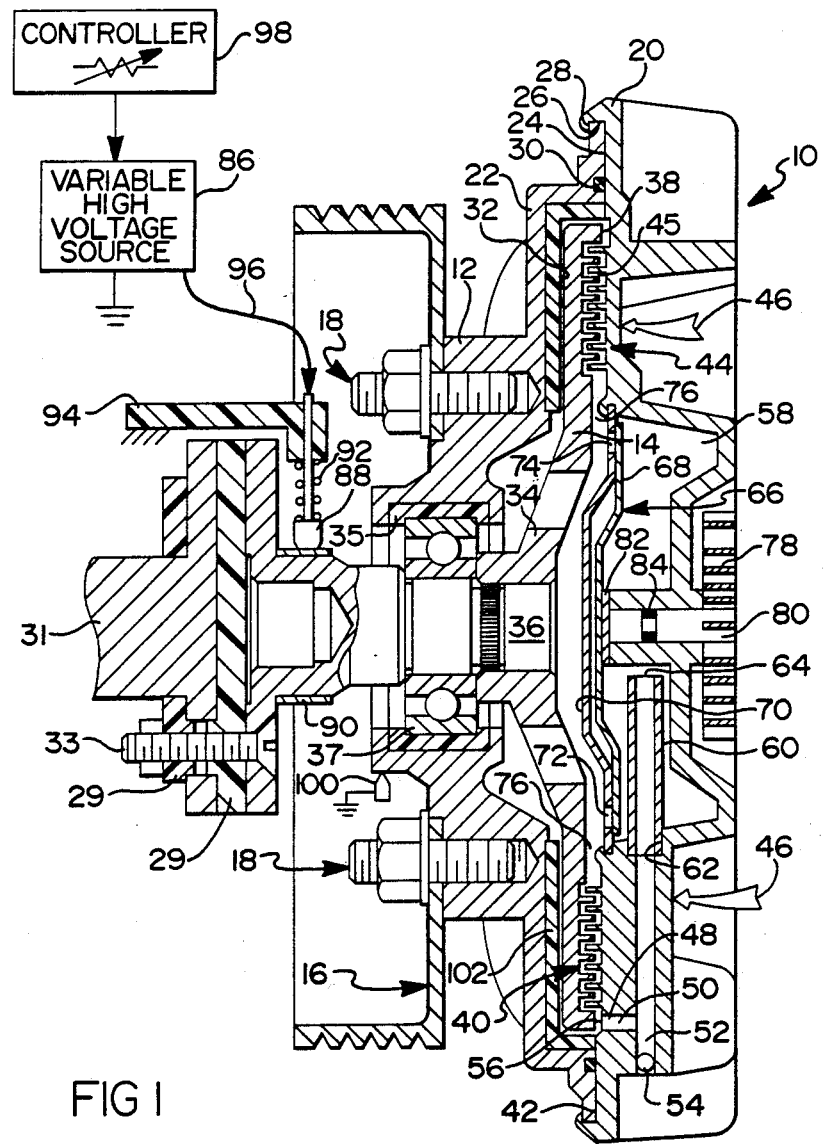
FIG. 1, is a broken side elevational view, taken mostly along the center line of a viscous fluid coupling assembly according to the preferred embodiment of the invention.

Referring to drawing FIG. 1, the present invention provides an improved viscous fluid clutch 10. The viscous fluid clutch 10 includes a body member 12 and a clutch member 14. Body member 12 has a belt pulley 16 secured thereto by means of fastener assemblies 18. Pulley 16 is intended to be driven by the host vehicle engine through a segmented endless drive belt (not illustrated) as is well known in the art.

Body member 12 is made in two-parts which, for the purposes of this application, are termed a forward coupling member 20 and a rear coupling member 22. Forward coupling member 20 is formed with a pilot portion having a surface 24 which extends peripherally therearound and which guides the outer portion 26 of rear coupling member 22 into assembled position therewith. When coupling members 20 and 22 are guided together into the position illustrated, a portion 28 of forward coupling member is bent over to secure and seal the forward and rear coupling members 20 and 22 respectively. A suitable gasket type O-ring seal 30 is provided between coupling members 20 and 22 in order to prevent leakage of electroviscous shear fluid therebetween.

Body member 12, constructed of the assembled forward and rear coupling member 20 and 22, defines a chamber generally designated 32 in which clutch member 14 rotates. Clutch member 14 is a disk shaped member which has an integral hub portion 34. Hub portion 34 is suitably fixedly secured for rotation with a shaft 36 which, in application, is coupled to a rotary member 31 of a load controlled by clutch 10 by suitable fasteners 33 and electrically insulating spacers 29. Body member 12 is mounted for rotation about shaft 36 upon an intermediate bearing 37 and electrically insulating spacer 35. Thus, clutch 10 is carried by rotary member 31 but is electrically isolated therefrom. Furthermore, body member 12 is carried for rotation about shaft 36 but is electrically isolated from clutch member 14.

Body member 12 and clutch member 14 have cooperating shear surfaces thereon which are spaced very close to each other whereby an electroviscous shear medium in the space between the surfaces transmits torque therebetween so that clutch member 14 rotates due to the torque transmission through the electroviscous shear fluid.

In the embodiment illustrated in drawing FIG. 1, the torque transmitting surfaces on members 12 and 14 are in the form of a plurality of lands and grooves. More specifically, a series of lands and grooves are formed on the forward face 38 of clutch member 14 and are generally designated 40. Cooperating lands and grooves are formed on the face 42 of forward coupling member 20 and are generally designated 44. Lands and grooves 44 on forward coupling member 20 cooperate with lands and grooves 40 on clutch member 14 and are, in effect, interdigitated as shown when assembled. The lands and grooves are very closely spaced and provide a substantial area for the transmission of torque between body and clutch members 12 and 14 in view of their relatively large number. In fact, there are nine projecting lands on body member 12 which project into nine grooves on clutch member 14 and eight lands on clutch member 14 projecting into eight grooves on body member 12. The annular volume between lands and grooves 40 and 44 is designated as an operating chamber 45.

Cooperating lands and grooves 40 and 44 are located in a direct line with the ram air which impinges against the outer face of forward coupling member 20. As a result, lands and grooves 40 and 44, which effect the torque transmission, are located as closely as possible to the ram air as indicated by arrows 46. There is a substantial amount of heat dissipation due to such location of lands and qrooves 40 and 44. This is a substantial improvement over designs having lands and grooves on the rear face of an input coupling member and cooperating lands and grooves on a mating rear part out of the ram air stream. It should be apparent that there is a substantial number of cooperating lands and grooves and these provide substantial torque transmitting surface area so that the viscous coupling has a substantial torque transmitting capability. This enables the viscous coupling to be readily used for driving relatively large vehicle born loads such as engine cooling fans, air conditioning compressors, auxiliary power units and the like.

As is known, the amount of torque transmitted between lands and grooves 40 and 44 to the load is a function to the amount of fluid in the viscous shear space or operating chamber 45 therebetween. The viscous coupling of the present invention is provided with a construction where the amount of electroviscous shear fluid in that space can be varied, due to requirements of the load. This is affected generally by the use of a mechanism for pumping electroviscous fluid from operating chamber 45 and a temperature sensing valve mechanism for controlling the flow of fluid back into the operating chamber 45.

The electroviscous shear fluid may be pumped from the operating chamber 45 by the action of a pair of pumping surfaces which are formed on face 42 of forward coupling member 20. This pumping arrangement is well known in the art and is described in detail in U.S. Pat. No. 3,809,197, the specification of which is incorporated herein by reference. The pumping surfaces are located in the path of flow of fluid as it is dragged around forward coupling member 20 by rotation of clutch member 14. The impingement against these surfaces creates a pressure adjacent pump exit ports 48 in body member 12. Pump exit ports 48 communicate with respective axially extending passages, one of which is shown and designated 50. Passage 50 communicates with a radially extending passageway 52 in forward coupling member 20. Passageway 52 is sealed at its radial outer end by a suitable means such as a plug or a pressed-in ball, designated 54. A similar radial flow passageway (not shown) cooperates with the other pump exit port (not illustrated).

Pump exit ports 48 are formed at one end of arcuate channels 56 in face 42 of forward coupling member 20. Each arcuate channel 56 extends slightly less than 180 degrees around output member 12, the viscous fluid being moved therein due to the movement or rotation of clutch member 14 with respect to body member 12. When the fluid impinges against surfaces described herein above it flows through passage 50 associated with pump exit ports 48 and into a central fluid storage chamber 58 after passing radially inwardly through passage 50, passageway 52, and a passage extending standpipe 60. The radially inward most end of passageway 52 has an area of increased diameter 62 within which the radially outward most end of standpipe 60 is pressed fit for retention thereby. Standpipe 60 depends radially inwardly from area of increased diameter 62 and terminates in a discharge opening 64 at a point within fluid storage chamber 58 adjacent or relatively near the central axis of shaft 36. Fluid storage chamber 58 comprises an annular chamber which encircles the axis of rotation of members 12 and 14 and provides for the storage of electroviscous shear fluid therein. The volume of fluid storage chamber 58 is such that substantially all of the electroviscous shear fluid in the coupling 10 may be stored therein, the surface of the stored fluid being at all times radially outward from discharge opening 64. Thus, even in the condition when all of the viscous fluid within clutch 10 is stored within fluid storage chamber 58, the fluid cannot migrate or drain back through passages 50 and 52. This is true both in static and in dynamic conditions for when member 12 is not rotating, all viscous fluid stored in the fluid storage chamber 58 will come to rest in the lower most portion of fluid storage chamber 58, its surface being below discharge opening 64. When member 12 is rotating, viscous fluid stored within fluid storage chamber 58 is forced towards the radially outward most wall of fluid storage chamber 58 and, again, the surface thereof is radially outward from discharge opening 64. Additionally, in the position illustrated, the standpipe which is not illustrated will be projecting radially downwardly into fluid storage chamber 58 and will also be unavailable as a drain passage for viscous fluid to return to passages 50 and 52. It is contemplated that the actual radial displacement of discharge opening 64 from the axis of rotation of shaft 36 can vary depending upon the electroviscous fluid storage capacity of that portion of fluid storage chamber 58 located radially outwardly of discharge opening 64. What is important is that, under all conditions, the level of the viscous fluid within fluid storage chamber 58 be radially outward from discharge opening 64.

The electroviscous shear fluid, as noted herein above, flows into the shear space defined by lands and grooves 40 and 44 under the control of a temperature responsive valve mechanism generally designated 66. Valve mechanism 66 specifically controls the flow of electroviscous fluid from fluid storage chamber 58 into operating chamber 45. Valve mechanism 66 includes a valve member 68 which cooperates with a plate 70 which defines one side of fluid storage 58. Plate 70 is suitable secured to forward coupling member 20 around the periphery of plate 70 and thereby defines the rear side of fluid storage chamber 58. Plate 70 has a pair of holes 72 and 74 therein and valve member 68 extends radially relative to plate 70 and is positionable to selectively overlay holes 72 and 74. If valve member 68 closes holes 72 and 74, the electroviscous fluid may not flow from storage chamber 58 outwardly thereof through holes 72 and 74. When valve member 68 is moved so that holes 72 and 74 are opened, fluid flows from fluid storage chamber 58 through those holes and into an area designated 76 and from that area the fluid is thrown by centrifugal force outwardly into operating chamber 45 between lands and grooves 40 and 44.

Valve member 68 is moved relative to plate 70 and relative to holes 70 and 72 therein by temperature sensing bimetallic spring element 78 which is suitably mounted in the conventional manner on forward coupling member 20 and which is connected to a shaft 80. Shaft 80 on its inner end is suitably connected to valve member 68 through an intermediate washer 82 such as by spot welding or the like and O-ring 84 which resides in an area of reduced diameter in shaft 80 substantially intermediate washer 82 and spring element 78 serves to form a seal between shaft 80 and forward coupling member 20. Temperature sensing by metallic spring element 78 is of the type which, when it senses a change in the ambient temperature surrounding it, it effects the rotation of shaft member 80. Shaft member 80, in turn, effects a movement of valve member 68 relative to plate 70. The specific temperature responsive valve device is similar to the valve device disclosed in U.S. Pat. No. 3,263,783 and reference may be made thereto for further details of construction and operation. Furthermore, spring element 78 could be replaced by a rotary solenoid tethered to a grounded portion of a host vehicle, or other suitable actuator device operative to selectively position valve member 68 in response to a parametric input signal to effect ON-OFF operation or controlled (dis)engagement of clutch 10.

If it is desired to reduce the amount of fluid in the shear surface between lands and grooves 40 and 44, it is necessary only to effect the movement of valve member 68 into a position blocking the flow of fluid from fluid storage chamber 58 into area 76. This occurs when temperature sensing bimetal element 78 senses a low temperature and therefore a reduction in the required speed of the driven load (fan). Holes 72 and 74 will be closed or their open area reduced, minimizing flow into operating chamber 45. As a result, the rotation of member 14 will cause fluid to be dragged or moved relative to the surfaces within channels 56 and the fluid will then flow through pump exit ports 48 and into fluid storage chamber 58 through discharge opening 64 of standpipe 60. As a result, there will be a net reduction of electroviscous fluid in the operating chamber 45 and therefore a reduction in the torque transmitted to the load. In the event that it is desired to increase the torque transmitted to the load, it is necessary then to increase the amount of fluid in operating chamber 45. As a result, holes 72 and 74 must pass a greater amount of fluid into the operating chamber 45 than that which is being past from the operating chamber 45 due to the action of the pumping surfaces therefore, holes 72 and 74 must be opened by valve member 68 in order to enable a sufficient flow of electroviscous fluid into operating chamber 45 to occur so that there is a net gain in the fluid within operating chamber 45.

When viscous fluid clutch 10 is at rest, all of the electroviscous shear fluid takes a position in the lower part thereof. Upon rotation, the electroviscous shear fluid is dragged around the periphery of clutch 10 by its rotation and due to centrifugal force, the viscous shear fluid flows outwardly into operating chamber 45. Once located in operating chamber 45, the electroviscous shear fluid due to pumping action of the pumping surfaces, flows into fluid storage chamber 58 and the flow of fluid from the fluid storage chamber 58 is under the control of valve member 68. As member 14 rotates relative to member 12, viscous shear fluid in the operating chamber 45 transmits torque between the members to effect a transmission of torque to the load. As this rotation occurs, periodic alignment occurs between radially disposed channels in members 14 and 12 as is described in detail in U.S. Pat. No. 3,809,197. As this occurs, the periodic alignment between those channels defines a relatively large passageway for radially outward flow of fluid from fluid storage chamber 58, thereby filling operating chamber 45 at the outer periphery thereof. These channels provide for flow radially outwardly at all times not only when aligned, and provide for rapid response due to flow from fluid storage chamber 58 and also during an initial start-up.

In addition to mechanical modulation of the circulating flow of electroviscous shear fluid by valve mechanism 66 described herein above, separate and independent control of the fluid flow is effected by exposing a portion of the fluid to an intense electric field to effect a localized change in its viscosity and thus flow rate. This control is essentially independent of the relative and absolute rates of rotation of body member 12 and clutch member 14.

As described herein above, shaft 36 is carried by but electrically insulated from rotary member 31. Shaft 36 and clutch member 14 are constructed of electrically conductive material and are electrically in circuit with a high voltage source 86 through a brush 88 and slip ring 90 arrangement. Brush 88 is pressed into intimate contact with slip ring 90 by a biasing spring 92 compressively loading brush 88 against a grounded insulating support member 94. Thus, voltage source 86 outputs a high voltage potential to clutch member 14 via a conductor 96, brush 88, slip ring 90 and shaft 36. The potential of the voltage applied on conductor 96 is varied by a controller 98.

Forward and rear coupling members 20, 22 of body member 12 are also constructed of electrically conductive material. As described herein above, body member 12 is carried for rotation upon shaft 36 but electrically insulated therefrom by spacer 35. Body member 12 is in circuit with high voltage source 86 via a brush/slip ring 100 through ground. Thus, body member 12 is maintained at ground potential at all times independent of its rotary position and speed. An electrically insulating annular spacer 102 is disposed within chamber 32 intermediate the left-hand most surface of clutch member 14 and rear coupling member 22. Annular spacer 102 is carried by rear coupling member 22 in closely spaced non-contacting relationship with clutch member 14, assuring that a minimum axial and radial spacing between clutch member 14 and rear coupling member 22 is maintain at all times. Body member 12 and clutch member 14 are configured so that their points of closest approach or spacing is provided by lands and grooves 40 and 44. Thus, when a voltage potential is applied to conductor 96, a large electric field will be produced in the area between adjacent respective lands and grooves 40 and 44 of body and clutch members 12 and 14 which constitutes the operating chamber 45 of clutch 10. In application, when valve member 68 is positioned to provide a flow of electroviscous fluid through operating chamber 45, the viscosity of fluid therein can be materially effected by the imposition of a high voltage on conductor 96 and thus the torque carrying capacity of clutch 10 controlled virtually instantaneously without requiring repositioning of valve member 68. Thus, in the preferred application, valve mechanism 66 can be employed for simple binary or ON-OFF operation while the high torque spikes encountered upon engagement and disengagement of clutch 10 under high load conditions can be absorbed by active control of high voltage source 86 by controller 98.

Figure 2:
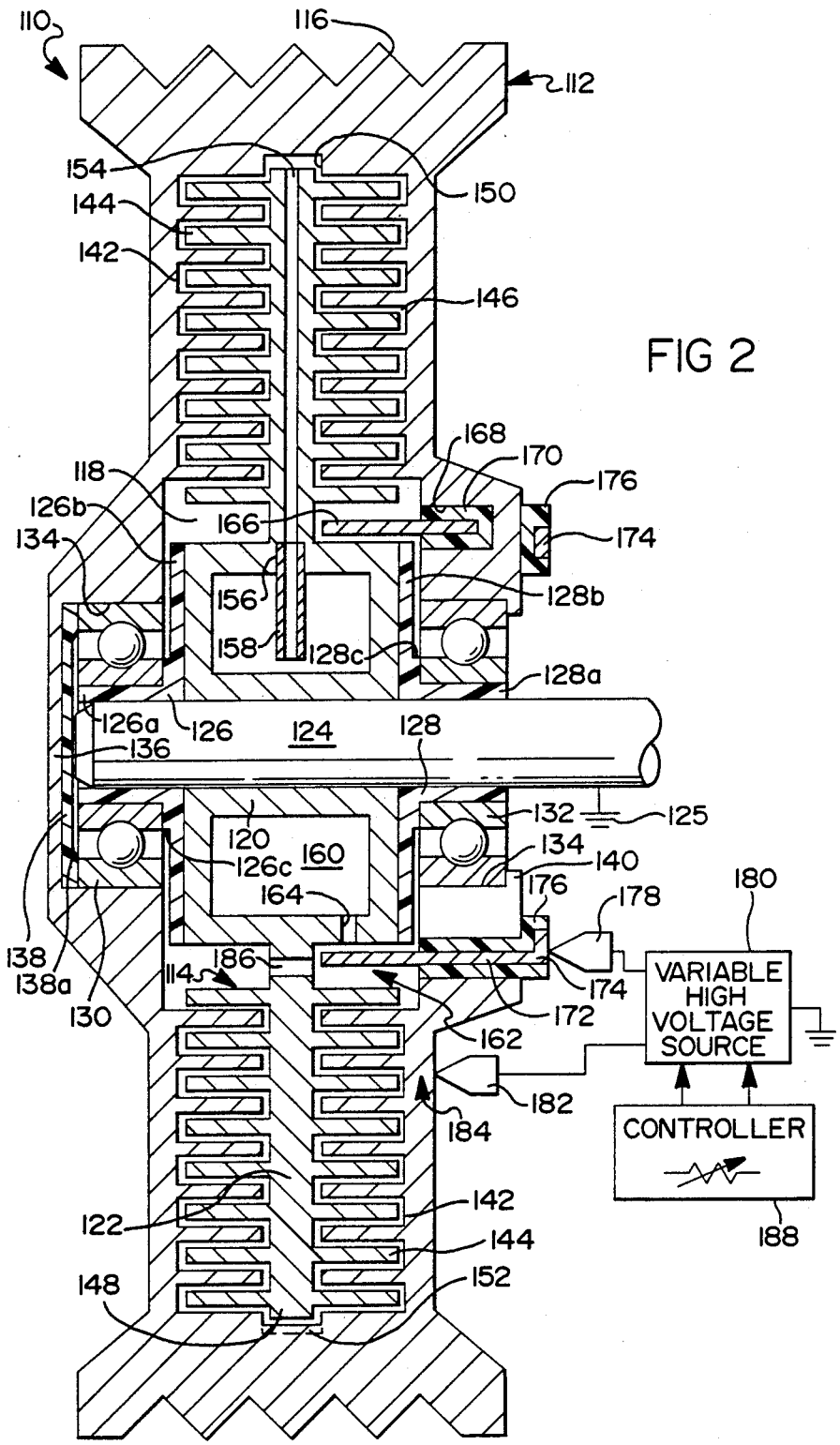
FIG. 2, is a broken side elevational view taken mostly along the center line of a viscous fluid coupling assembly according to an alternative embodiment of the invention.

Referring to FIG. 2, an alternative embodiment of a viscous fluid clutch 110 is illustrated comprising a body member assembly 112 and a clutch member assembly 114. Assemblies 112 and 114 of clutch 110 are illustrated in basic one piece configurations for the sake of simplicity and clarification in a description of operating principles. In is understood however, that in actual practice, assemblies 112 and 114 would comprise a plurality of combined structural components.

The outer circumferential surface 116 of body member 112 constitutes a pulley intended to be driven by the host vehicle engine through a segmented endless drive belt (not illustrated) as is well known in the art.

Body and clutch members 112 and 114 are constructed of electrically conductive material. Body member 112 defines a chamber generally designated 118 in which clutch member 114 rotates. Clutch member 114 comprises a hollow cylindrical hub portion 120 and an integral radially outwardly extending disk shaped portion 122. Hub portion 120 is suitable fixedly secured for rotation with a shaft 124 which, in application, is coupled to a rotary member (not illustrated) of a load controlled by clutch 110. Shaft 124 is constructed of electrically conductive material and is at ground potential as indicated at 126 via appropriate brushes/slip rings (not illustrated) or other suitable means. A pair of flanged spacers 125 and 128 are carried upon shaft 124 interspaced by hub portion 120 of clutch member 114. Spacers 126 and 128 are formed of electrically insulating material and comprise axially outwardly extending bushing portions 126a and 128a, respectively, and generally disk shaped stop portions 126b and 128b, respectively, extending radially outwardly from bushing portions 126a and 126b, respectively. Stop portions 126b and 128b extend radially co-extensively with hub portion 120 of clutch member 114. The inner races of a pair of roller bearings 130 and 132, respectively, are press fit over bushing portions 126a and 128a and into an axially abutting relationship with stop portions 126b and 128b, respectively. Stop portions 126b and 128b have steps 126c and 128c formed therein to insure that the outer races of bearings 130 and 132 remain slightly spaced from bushings 126 and 128, respectively. Body member 112 includes an axially oriented blind bore 134 opening rightwardly therefrom as viewed in FIG. 2. The left-hand most end of bore 134 is closed by an integral web 136 formed in the left-hand most portion of body member 112. A generally disk shaped spacer 138 formed of electrically insulating material is press fit within bore 134 adjacent web 136. Spacer 138 includes a circumferential step 138a about the radially outward most portion thereof. In assembly, the outer races of bearings 130 and 132 are press fit within bore 134. The left-hand most surface of the outer race of bearing 130 is in abutting relationship with step 138a of spacer 138. Step 138a assures a slightly spaced relationship between spacer 138 and the inner race of bearing 130 as well as electrically insulating shaft 124 from body member 112. Thus assembled, steps 126c and 138a prevent axial displacement of bearing 130. A portion of body member 112 adjacent the opening of bore 134 is deformed at 140 to embrace the right-hand most portion of outer race of bearing 132 whereby step 128c and area of deformation 140 prevent axial displacement of bearing 132. With this arrangement, body member 112 is carried for rotation upon shaft 124 in close rotational alignment with clutch member 114 but is electrically insulated therefrom.

Body member 112 and clutch member 114 have dual sets of cooperating shear surfaces thereon which are spaced very close together whereby an electroviscous shear medium in the space between the surfaces transmits torque therebetween such that clutch member 114 rotates due to the torque transmission through the electroviscous shear fluid.

As in the case of the preferred embodiment of the invention described herein above, the torque transmitting surfaces on members 112 and 114 are in the form of a plurality of lands and grooves shown generally at 142 and 144, respectively, which are interdigitated as shown when assembled. Lands and grooves 142 and 144 are very closely spaced and provide a substantial area for the transmission of torque between body and clutch members 112 and 114. The surface area and inner spacing of lands and grooves 142 and 144 as well as the voltage potential applied there across are design criteria effected by the size of the load controlled by clutch 110, ambient conditions and other considerations. Accordingly, the specific embodiments illustrated in FIGS. 1 and 2 therein are intended for purposes of illustration only and are not to be scaled. The annular volume between lands and grooves 142 and 144 is designated as an operating chamber 146.

As in the case of the embodiment of the invention illustrated in FIG. 1, the embodiment of FIG. 2 is provided with a construction where the amount of electroviscous shear fluid in operating chamber 146 can be varied, due to requirements of the load. This is effected generally by the use of a mechanism for pumping the fluid from operating chamber 146 and a valve mechanism for controlling the flow of fluid back into operating chamber 146. Pumping action is accomplished by the radially outward most circumferential portion 148 of disk portion 122 of clutch member 114 rotating within a radially inwardly opening circumferential groove 150 formed in the radially outward most portion of chamber 118 of body member 112. Groove 150 has one or more radially inwardly extending weirs 152 formed therein operative to create a localized pressure increase in the electroviscous fluid drag due to the relative rotation between portion 148 within groove 150. This localized increase of pressure results in a flow of fluid through a radially inwardly directed pump exit passageway 154 formed within disk portion 122. The radially inward most end of passageway 154 has an area of increased diameter 156 within which the radially outward most end of a standpipe 158 is press fit. Standpipe 158 extends radially inwardly within an annular fluid storage chamber 160 disposed concentrically about the axis of shaft 124 and entirely enclosed by hub portion 120 of clutch member 114. Standpipe 158 opens at a point as nearly practical as possible to the axis of rotation of clutch member 114 for the reasons described herein above with respect to the embodiment of the invention of FIG. 1.

Electroviscous shear fluid, as noted herein above flows into operating chamber 146 under the control of an electroviscous fluid valve generally designated 162. Valve 162 specifically controls the flow of electroviscous fluid from fluid storage chamber 160 into operating chamber 146. Valve 162 includes a radially outwardly opening drain port 164 interconnecting the radially outward most portion of fluid storage chamber 160 with chamber 118 of body member 112. A cylindrical electrode 166 is positioned in precise rotational alignment with the radially outward most opening of drain port 164 in a spaced relationship thereto. Electrode 166 is retained in its illustrated position for rotation with body member 112 by being press fit within an axially opening groove 168 opening leftwardly within chamber 118 through an intermediate annular insulator 170 having a typical U-shaped cross section configuration. Electrode 166 extends leftwardly into chamber 118 and is closely radially spaced with the outer circumferential surface of hub portion 120 and is also closely axially spaced with the adjoining portion of disk portion 122 of clutch member 114. Thus configured, electrode 166 is electrically insulated from both body member 112 and clutch member 114 and is continuously in close spaced relationship with the outlet of drain port 164 independent of the relative angular positions thereof. External electrical innerface with electrode 166 is provided by the provision of one or more localized axial extensions 172 electrically interconnecting electrode 166 with an annular track or rail 174 carried on the outer surface of body member 112 through an intermediate annular insulator 176 suitably bonded to both body member 112 and track 174. Track 174 is disposed concentric to shaft 124 whereby when a suitable brush or wiper assembly 178 is axially pressed there against, a continuous electrical conduction path is established between electrode 166 and a variable high voltage source 180 independent of the relative angular position of body member 112. As will be described herein below, voltage source 180 has a second output to a brush/wiper 182 which continuously bears against an outer surface portion of body member 112 at a location generally designated 184 as comprising an integral track or rail.

A number of passageways 186 extend through disk portion 122 of clutch member 114 at a radial position adjacent electrode 166 to insure a nearly equal distribution of electroviscous fluid flow to the respective left and right sets of lands and grooves 142 and 144. High voltage source 180 is connected to ground and interconnected with a controller 188 which serves a dual function as will be described herein below.

In application, controller 188 would provide various inputs to high voltage source 180. Such inputs could be either analog or ON/OFF temperature, torque, operator demand or other parametric input suitable for the application. As described with reference to the preferred embodiment of the invention, voltage source 180 would output a relatively high voltage potential to brush/wiper 182, the magnitude of which would be varied as a function of the inputs from controller 188. This would result in the establishment of an intense electric field within operating chamber 146 which would vary the viscosity of the fluid therein in a controlled manner to thereby control the amount of torque transmitted between body member 112 and clutch member 114. In addition, high voltage source 180 would provide a separate output voltage signal to electrode 166 via track 174 and extension 172 to create a second region of intense electric field localized about the area between the radially innermost surface of electrode 166 and the radially outermost portion of hub 120. Thus, in operation, the flow of electroviscous fluid from fluid storage chamber 160 to operating chamber 146 via drain port 164 could be controlled by fluid valve 162 through the imposition of the electric field between electrode 166 and hub 120. In the intended application, the voltage potential at electrode 166 would be high enough to effectively solidify or clot electroviscous fluid attempting to exit port 164 and thereby prevent additional fluid from entering operating chamber 164. When desired, the electrical potential at wiper 178 could be switched off all together, wherein the viscosity of fluid exiting port 164 is increased to the point where the pressure due to the centrifugal forces acting upon the reservoir of fluid within storage chamber 164 causes an outward flow through port 164, additional fluid will thus enter operating chamber 146.

To disengage clutch 110, the voltage potential at electrode 166 would be maximized to prevent fluid from escaping fluid storage chamber 160 and simultaneously, the potential at brush 182 would be minimized or eliminated to minimize the viscosity of electroviscous fluid within operating chamber 146 whereby during relative rotation between body member 112 and clutch member 114, fluid within operating chamber 146 would tend to be pumped radially inwardly via passageway 154 and standpipe 158 into fluid storage chamber 160. Under these conditions, virtually all of the fluid in operating chamber 146 would be rapidly pumped into fluid storage chamber 160 whereby parasitic losses during subsequent relative rotation between the members would be eliminated. To engage the clutch, the potential at brush 178 would be eliminated or materially reduced thereby establishing a rapid flow of fluid from storage chamber 168 into operating chamber 146 to again effect the transmission of torque therebetween. For large load applications, it is contemplated that initially the electrical potential at brush 182 would not be re-established, but rather operating chamber 146 would be first re-filled with relatively low viscosity fluid. This control will provide for a minimal torque transmission between members 12 and 14 at initial engagement. Subsequently, the voltage potential at brush 182 could be increased gradually to provide a controlled engagement of clutch 110 depending upon system needs and the type of load being controlled.

It is to be understood that the invention has been described with reference to a specific embodiment which provides the features and advantages previously described, and that such specific embodiment is susceptible of modification, as will be apparent to those skilled in the art. Accordingly, the foregoing is not to be construed in a limiting sense.

What is claimed is:

1. An electroviscous fluid clutch comprising:
   first and second members mounted for relative rotation about a common axis and defining cooperating shear surfaces forming an operating chamber therebetween;
   means operative to circulate electroviscous fluid between said operating chamber and a storage chamber;
   a passageway operative to interconnect said operating and storage chambers;
   a source of high voltage potential; and
   a plurality of electrodes in circuit with said source positioned to establish an electrostatic field within said passageway to selectively vary the characteristic viscosity of fluid flowing therethrough to modulate said circulating flow as a function of a sensed parametric input.

2. The electroviscous fluid clutch of claim 1, wherein said sensed parametric input comprises a host system temperature.

3. The electroviscous fluid clutch of claim 1, further comprising a second plurality of electrodes in circuit with said source positioned to establish an electrostatic field within said operating chamber to selectively vary the characteristic viscosity of fluid therein.

4. The electroviscous fluid clutch of claim 1, wherein said fluid circulation means operates during relative rotation between said members.

5. An electroviscous fluid clutch comprising:

first and second members mounted for relative rotation about a common axis and defining cooperating shear surfaces forming an operating chamber therebetween;

a return passageway operative to direct electroviscous fluid from said operating chamber to a storage chamber as a function of relative rotation between said members;

a source of high voltage potential; and first and second electrodes in circuit with said source positioned to establish a variable electrostatic fluid within said return passageway to effect a change in the characteristic viscosity of fluid within said return passageway to effect modulation of electroviscous fluid flowing from said storage chamber to said operating chamber as a function of a sensed parametric input.

6. An electroviscous fluid clutch comprising:

a first member secured for rotation with a shaft;

a second member rotatably disposed on said shaft relative to said first member;

shear surfaces disposed on said first and second members and forming an operating chamber therebetween;

a fluid storage chamber disposed adjacent said operating chamber;

pump means operative to displace electroviscous fluid from said operating chamber and discharge said fluid within said fluid storage chamber as a function of relative rotation between said first and second members;

a return passageway effecting communication between said storage chamber and said operating chamber;

a source of high voltage potential; and first and second electrodes carried with said first and second members, respectively, in circuit with said source and positioned to establish a variable electrostatic field within said return passageway to effect a change in the characteristic viscosity of fluid within said return passageway to modulate flow of fluid therethrough.

7. The electroviscous fluid clutch of claim 6, further comprising means operative to control said source of high voltage potential as a function of a second sensed parametric input.

8. An electroviscous fluid clutch comprising:

an electrically conductive clutch member secured for rotation with a shaft;

an electrically conductive cover member rotatably disposed on said shaft relative to said first member and electrically insulated therefrom;

shear surfaces disposed on said clutch and cover members and forming an operating chamber therebetween;

means defining an annular fluid storage chamber carried by one of said members and disposed coaxially with said shaft;

at least one pump defined by adjacent portions of said clutch member and cover member radially distal said shaft and operative to displace electroviscous fluid from said operating chamber radially inwardly to a point within said fluid storage chamber substantially adjacent the axis of said shaft and which is spaced above the uppermost surface level assumed by the electroviscous fluid within the storage chamber when substantially all of said fluid is disposed therein during periods of relatively low torque transmission through said clutch;

a passageway operative to interconnect said fluid storage chamber and operating chamber;

a first source of variable high voltage potential in circuit with said clutch and cover members whereby said clutch and cover members function as spaced electrodes when a voltage potential is applied there across to establish a variable electrostatic field within said operating chamber to effect a change in the characteristic viscosity of fluid within said operating chamber;

a second source of high voltage potential; and a third electrode insulatingly carried by one of said members, in circuit with said second source of high voltage potential and positioned to selectively establish an electrostatic field within said return passageway to prevent electroviscous fluid in said fluid storage chamber from flowing into said operating chamber when said passageway electrostatic field is present and, in the absence of said passageway electrostatic field, to establish fluid communication between the radially outward most portion of said fluid storage chamber and said operating chamber, the electroviscous fluid flowing therebetween under the influence of centrifugal forces acting upon electroviscous fluid within said fluid storage chamber during periods of relatively high torque transmission through said clutch.

9. The electroviscous fluid clutch of claim 8, wherein said sources of high voltage potential are relatively stationary with respect to said clutch and cover members and are electrically interconnected therewith through intermediate slip interfaces.

10. The electroviscous fluid clutch of claim 8, wherein a substantially radially oriented standpipe interconnects the outlet of each pump and discharges fluid into said fluid storage chamber at said point substantially adjacent said axis.

* * * * *